(12) United States Patent
Jang et al.

(10) Patent No.: US 9,617,099 B2
(45) Date of Patent: Apr. 11, 2017

(54) PAPER MEDIUM RECOGNITION DEVICE AND METHOD FOR ALIGNING SAID PAPER MEDIUM

(71) Applicant: Nautilus Hyosung Inc., Seoul (KR)

(72) Inventors: Chul Won Jang, Gyeonggi-do (KR); Yun Seok Jeong, Gyeonggi-do (KR)

(73) Assignee: NAUTILUS HYOSUNG INC., Seoul (KR)

( * ) Notice: Subject to any disclaimer, the term of this patent is extended or adjusted under 35 U.S.C. 154(b) by 0 days.

(21) Appl. No.: 14/758,766

(22) PCT Filed: Dec. 23, 2013

(86) PCT No.: PCT/KR2013/012022
§ 371 (c)(1),
(2) Date: Jun. 30, 2015

(87) PCT Pub. No.: WO2014/104682
PCT Pub. Date: Jul. 3, 2014

(65) Prior Publication Data
US 2015/0353310 A1    Dec. 10, 2015

(30) Foreign Application Priority Data

Dec. 31, 2012    (KR) ........................ 10-2012-0158005

(51) Int. Cl.
*B65H 1/14*    (2006.01)
*B65H 9/10*    (2006.01)
(Continued)

(52) U.S. Cl.
CPC ............. *B65H 9/106* (2013.01); *B65H 9/002* (2013.01); *B65H 9/166* (2013.01); *F16H 1/14* (2013.01);
(Continued)

(58) Field of Classification Search
CPC . B65H 7/10; B65H 9/00; B65H 9/106; B65H 9/20; B65H 9/166; B65H 2404/1112;
(Continued)

(56) References Cited

U.S. PATENT DOCUMENTS

| | | | |
|---|---|---|---|
| 5,078,384 A * | 1/1992 | Moore | B65H 7/08 271/228 |
| 6,267,372 B1 * | 7/2001 | Mylaeus | B65H 3/063 271/226 |

(Continued)

FOREIGN PATENT DOCUMENTS

| | | |
|---|---|---|
| JP | 2005-535043 A | 11/2005 |
| JP | 2007-70072 A | 3/2007 |

(Continued)

OTHER PUBLICATIONS

Patent Cooperation Treaty, International Search Report, International Patent Application No. PCT/KR2013/012022, Mar. 21, 2014, 5 Pages (with English translation).

*Primary Examiner* — Jeremy R Severson
(74) *Attorney, Agent, or Firm* — Fenwick & West LLP

(57) ABSTRACT

A paper medium recognition device according to one embodiment of the present invention includes: a main body that provides a transportation path in which an alignment reference line for aligning a paper medium is arranged on one side; and an alignment unit which has a transportation roller which transports the paper medium in the longitudinal direction along the transportation path, and which has an alignment roller that is arranged in the direction orthogonal to the transportation roller so as to transport the paper medium in the width direction toward the alignment reference line. A phase difference is provided during the rotation of the transportation roller and the alignment roller, and thus (Continued)

the paper medium can be alternately transported in the longitudinal direction and width direction.

9 Claims, 8 Drawing Sheets

(51) Int. Cl.
  *B65H 9/00* (2006.01)
  *F16H 1/14* (2006.01)
  *B65H 9/16* (2006.01)
  *G07D 11/00* (2006.01)
(52) U.S. Cl.
  CPC .. *G07D 11/0027* (2013.01); *B65H 2404/1112* (2013.01); *B65H 2701/1912* (2013.01)
(58) Field of Classification Search
  CPC .... B65H 2404/1113; B65H 2404/1414; B65H 2404/114; B65H 2404/1411
  See application file for complete search history.

(56) References Cited

U.S. PATENT DOCUMENTS

| | | | | |
|---|---|---|---|---|
| 6,663,103 | B2* | 12/2003 | Dobberstein | B65H 9/002 271/227 |
| 6,676,123 | B2* | 1/2004 | Sahlmann | B65H 9/002 271/227 |
| 6,817,609 | B2* | 11/2004 | Halvonik | B65H 9/00 271/227 |
| 7,753,370 | B2* | 7/2010 | Inoue | B65H 1/04 271/234 |
| 7,758,043 | B2* | 7/2010 | Keller | B65H 29/12 271/184 |
| 8,523,235 | B2 | 9/2013 | Kwak et al. | |
| 2007/0181668 | A1 | 8/2007 | Kwak et al. | |
| 2010/0158596 | A1* | 6/2010 | Inoue | B65H 5/062 399/401 |

FOREIGN PATENT DOCUMENTS

| | | |
|---|---|---|
| KR | 10-2007-0079669 A | 8/2007 |
| KR | 10-2010-0018930 A | 2/2010 |
| KR | 20-2010-0001395 U | 2/2010 |

* cited by examiner

PAPER MEDIUM RECOGNITION DEVICE AND METHOD FOR ALIGNING SAID PAPER MEDIUM

TECHNICAL FIELD

The present invention relates to a paper media recognition device and a method for aligning said paper medium. More particularly, the present invention relates to a paper media recognition device that can reduce both time it takes to align the paper medium and the length of a transfer path required for the alignment of the paper medium, and a method for aligning said paper medium.

BACKGROUND ART

Generally, automatic teller machines (ATMs) are electronic telecommunication devices that enable users to use financial services such as depositing or withdrawing of cash and checks using cards or bankbooks regardless of time and place without the need for a cashier or bank teller. Recently, use of ATMs is increasing not only in banking facilities, but also in convenience stores, department stores and other public places.

According to deposit and withdrawal availability, ATMs are classified into a withdrawal machine, a deposit machine, and a deposit and withdrawal machine. Nowadays, ATMs are used in various ways, for example, not only for deposit and withdrawal of cash but also for deposit and withdrawal of checks, update of bankbooks, paying by giro, ticketing, etc.

Furthermore, a check recognition apparatus, which is a kind of ATM, recognizes a variety of information. Such a check recognition apparatus enables a user to easily and rapidly deposit a check without using a bank window. For the sake of recognition of information of a check, the use of such check recognition apparatuses has been increased.

The check recognition apparatus reads and records information of a check input thereinto through an inlet and may print predetermined information on the check. Typically, check identification information such as a check number, a serial number, an account number, etc. is printed on a lower end of a front surface of a check by magnetic ink characters. The check recognition apparatus is provided with a device such as a magnetic ink character reader (MICR) to read the identification information of a check. Furthermore, a printer is installed in the check recognition apparatus so that information about an account, a date, etc. can be printed on the check.

To enhance the check recognition precision of the check recognition apparatus, the check must be precisely aligned with a reference while being transferred. For this, the check recognition apparatus is provided with an alignment unit that aligns the check with a reference alignment surface before the check is recognized by the apparatus. However, the structure of the alignment unit in accordance with a conventional technique is complex, thus reducing efficiency in the use of space, thereby increasing the size of the apparatus. In addition, it takes a comparatively long time to align the check, whereby there is a problem in that time required for recognizing the check is increased.

DISCLOSURE

Technical Problem

It is an object of the present invention to provide paper media recognition device in which an alignment roller and a transfer roller are disposed in an initial position such that a phase difference is present therebetween, whereby the distance that the check is transferred by the alignment roller can be longer than the distance that the check is transferred by the transfer roller, thus reducing not only time it takes to align the check but also the length of a transfer path required for alignment of the check, thereby enhancing efficiency in the use of space in a main body, and reducing the size of the apparatus, and a method for aligning said paper medium.

Another object of the present invention is to provide a paper media recognition device in which the transfer roller and the alignment roller are interlocked with each other so that transfer and alignment of the paper medium can be simultaneously conducted, whereby the paper medium can be rapidly aligned with a reference alignment surface, and a method for aligning said paper medium.

Technical Solution

In accordance with an embodiment of the present invention, there is provided a paper media recognition device that includes a main body forming a main frame, with a transfer path for the paper medium formed in an internal space of the main body, and an alignment unit for aligning the paper medium with a reference alignment surface, the paper medium being transferred along the transfer path, wherein the alignment unit comprises a transfer roller for transferring the paper medium in a direction of the transfer path, and an alignment roller disposed in a lateral direction of the transfer roller, the alignment roller transferring the paper medium toward the reference alignment surface, and wherein when in an initial position at which the paper medium is supplied to the transfer roller, the transfer roller and the alignment roller have a phase difference therebetween such that a distance that the paper medium is transferred by the alignment roller is longer than a distance that the paper medium is transferred by the transfer roller.

In accordance with an embodiment of the present invention, there is provided a method for aligning paper medium of paper media recognition device, the device comprises a main body forming a transfer path for the paper medium in an internal space thereof, and an alignment unit for aligning the paper medium with a reference alignment surface, the paper medium being transferred along the transfer path, the alignment unit comprising a transfer roller for transferring the paper medium in a direction of the transfer path, and an alignment roller disposed in a lateral direction of the transfer roller, the alignment roller transferring the paper medium toward the reference alignment surface, wherein when in an initial position at which the paper medium is supplied to the transfer roller, the alignment roller has a phase difference with respect to the transfer roller such that a distance that the paper medium is transferred by the alignment roller is longer than a distance that the paper medium is transferred by the transfer roller, the paper medium alignment method comprises driving the alignment unit when an approach detecting sensor provided in a front end of the alignment unit and disposed on the transfer path senses approach of the paper medium, aligning the paper medium with the reference alignment surface by means of interlocking the transfer roller and the alignment roller with each other, sensing whether the paper medium is aligned with the reference alignment surface using a plurality of alignment sensors, and interrupting the operation of the alignment unit when completion of the alignment of the paper medium is sensed, wherein in the alignment operation, after the transfer roller is rotated by the phase difference while the paper medium is held by the transfer roller, the alignment roller holds the paper medium.

Advantageous Effects

In a paper media recognition device and method for aligning said paper medium in accordance with an embodiment of the present invention, an alignment roller and a transfer roller are disposed in an initial position such that a phase difference is present therebetween. Thereby, the distance that the check is transferred by the alignment roller can be longer than the distance that the check is transferred by the transfer roller. Thus, not only time it takes to align the check but also the length of a transfer path required for alignment of the check can be reduced. Consequently, efficiency in the use of space in a main body can be enhanced, and the size of the apparatus can be reduced.

Furthermore, the transfer roller and the alignment roller are interlocked with each other so that transfer and alignment of the paper medium can be simultaneously conducted, whereby the paper medium can be rapidly aligned with a reference alignment surface.

BEST MODE

Hereinafter, an exemplary embodiment of the present invention will be described in detail with reference to the accompanying drawings so that they can be readily implemented by those skilled in the art.

While the invention has been shown and described with respect to the preferred embodiments.

It will be understood by those skilled in the art that various changes and modifications may be made without departing from the spirit and scope of the invention as defined in the following claims.

Figure 1:
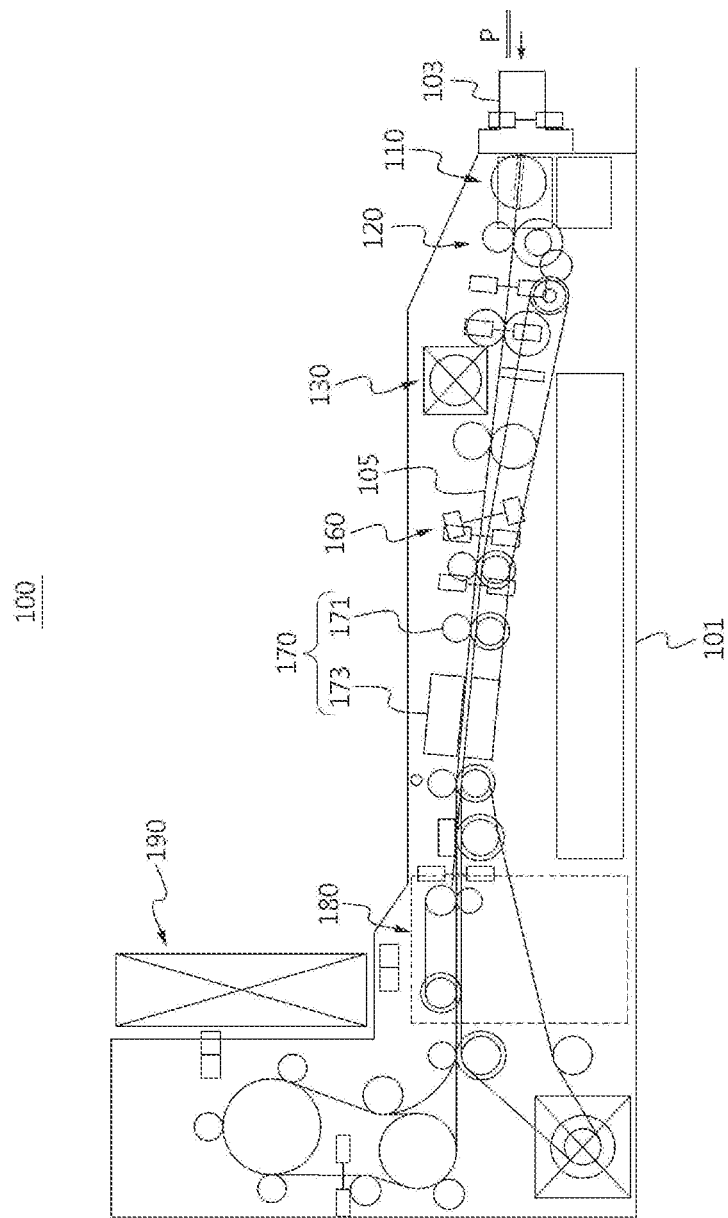
FIG. 1 is a view illustrating the overall construction of a check recognition apparatus in accordance with an embodiment of the present invention.

FIG. 1 is a view illustrating the overall construction of a check recognition apparatus in accordance with an embodiment of the present invention.

Referring to FIG. 1, a paper media recognition device 100, that is, a check recognition apparatus 100, in accordance with an embodiment of the present invention includes: a main body 101 that forms a transfer path 105 for a check P; a shutter 110 that is installed in an inlet 103 of the main body 101; a pick-up roller unit 120 that picks up the check P inserted into the main body 101 through the shutter 110; an alignment unit 130 that aligns the picked-up check P with a reference alignment surface (130S, refer to FIG. 2); a double-sheet detection unit 160 that senses whether the aligned check P is a single sheet; an authenticity discrimination unit 170 that discriminates the authenticity of the check P; and an endorsement unit 180 that endorses the check P. The check recognition apparatus 100 further includes a control unit 190 that controls the above elements.

The elements will be described in detail below. The shutter 110 in accordance with this embodiment opens when a user inserts the check P into the inlet after pressing a deposit button or the like indicated on a display. Then, the check P can enter the transfer path 105 of the apparatus that begins from the shutter 110.

The pick-up roller unit 120 is operated along with opening of the shutter 110 and picks up the check P inserted into the shutter 110. The picked-up check P is moved along the transfer path 105.

The pick-up roller unit 120 and the shutter 110 in accordance with this embodiment interlock with each other. In detail, the pick-up roller unit 120 is operated such that it can pick up the check P simultaneously with opening of the shutter 110.

Meanwhile, the alignment unit 130 in accordance with this embodiment functions to align the check P, picked up to the transfer path 105 by the pick-up roller unit 120, with the reference alignment surface 130S. In the case of the alignment unit 130 of this embodiment, it can rapidly conduct the alignment operation despite having a compact structure, thus making it possible to simplify the operation of recognizing the check P. The alignment unit 130 will be described in detail later herein after the other elements are first described.

The check P aligned by the alignment unit 130 can be tested for whether the check P is a single sheet by the double-sheet detection unit 160 provided in a rear portion of the alignment unit 130. In this embodiment, the double-sheet detection unit 160 may comprise an ultrasonic sensor and can check whether the check P that is being transferred is a single sheet or not.

After it is checked whether the check P is a single sheet, the authenticity discrimination unit 170 checks the authenticity of the check P. The authenticity discrimination unit 170 of this embodiment includes a contact image sensor (CIS) 173 that scans images of both sides of the check P, and a magnetic ink character recognition (MICR) sensor 171 that recognizes the magnetic properties of the check P and checks the authenticity thereof.

As the result of recognition by the authenticity discrimination unit 170 having the above-mentioned construction, if the check P is normal, the check P is endorsed by the endorsement unit 180, which will be explained later herein, before the check P is returned out or stored in a separate stack unit (not shown) that stores checks P therein.

The endorsement unit 180 of this embodiment functions to endorse the check P and includes an ink nozzle (not shown) that discharges ink to endorse the check P, and an ink cleaner (not shown) that is disposed at a position opposing to the ink nozzle and used as a cleaner.

The ink cleaner absorbs ink to prevent the ink nozzle from being dry and also wipes the ink nozzle to remove ink from the ink nozzle, thereby functioning to clean the ink nozzle.

Meanwhile, as stated above, the alignment unit 130 of this embodiment is disposed on the transfer path 105 between the pick-up roller unit 120 and the double-sheet detection unit 160 and functions to align the check P, picked-up by the pick-up roller unit 120, with the reference alignment surface 130S.

Figure 2:
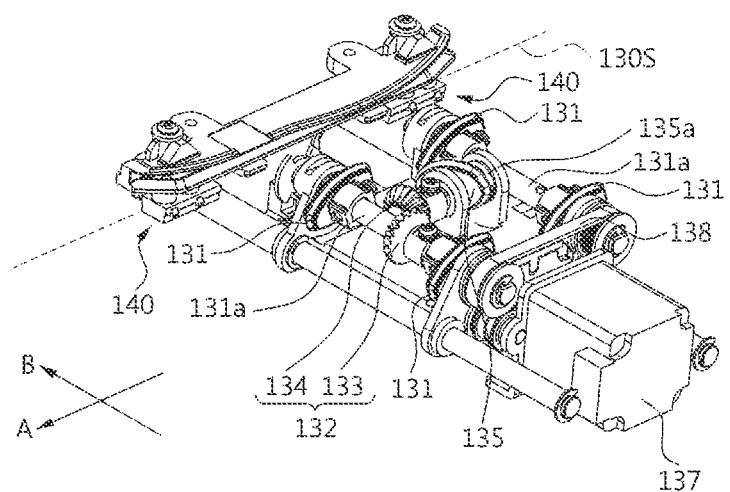
FIG. 2 is a perspective view of an alignment unit shown in FIG. 1.

FIG. 2 is a perspective view of an alignment unit shown in FIG. 1.

Figure 3:
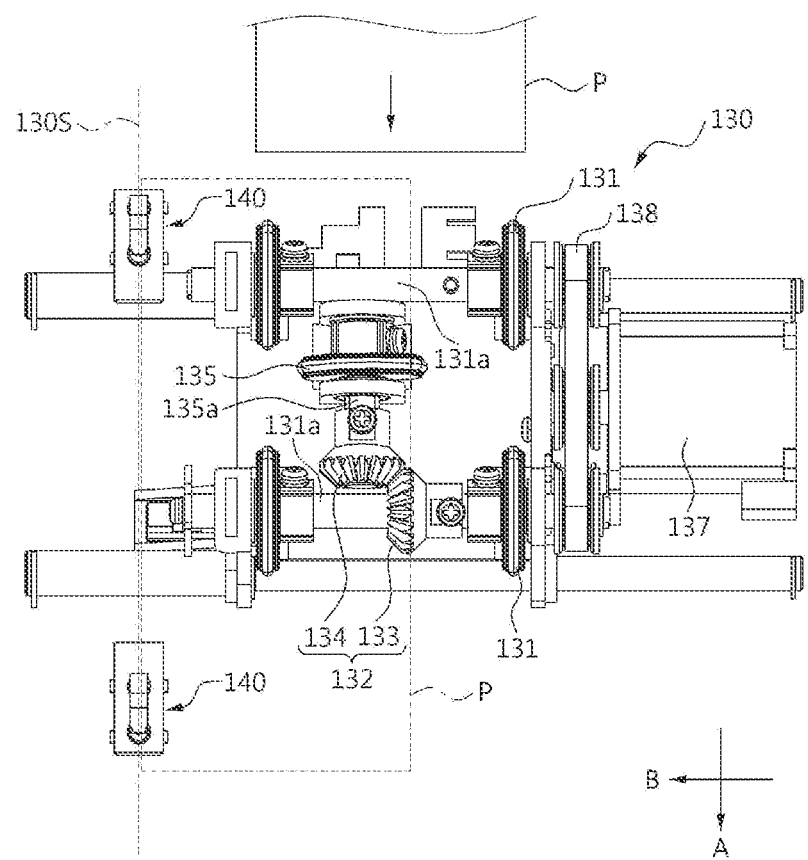
FIG. 3 is a plan view illustrating the alignment unit of FIG. 2.

As shown in FIGS. 2 and 3, the alignment unit 130 includes a transfer roller 131 that transfers the check P in the direction (designated by the arrow A) of the transfer path 105, an alignment roller 135 that is disposed in a lateral direction of the transfer roller 131, in more detail, in a direction perpendicular to the transfer roller 131, and transfers the check P in the direction (designated by the arrow B) of the reference alignment surface 130S, and an alignment drive motor 137 that drives the transfer roller 131 and the alignment roller 135.

Here, a shaft 131a of the transfer roller 131 and a shaft 135a of the alignment roller 135 are connected to each other by a bevel gear unit 132. Therefore, when the shaft 131a of the transfer roller 131 is rotated by the alignment drive motor 137, the alignment roller 135 can also be rotated. Thereby, the operation of aligning the check P can be conducted while the check P is transferred in the direction of the transfer path 105.

As shown in FIGS. 2 and 3, the transfer roller 131 comprises a pair of transfer rollers 131 installed on the shaft 131a. The shaft 131a on which the two transfer rollers 131 are installed comprises two shafts 131a that are disposed at positions spaced apart from each other in the direction of the transfer path 105. The two shafts 131a are connected to each other by a connection belt 138. Therefore, when either shaft 131a is rotated by the alignment drive motor 137, which will be explained later herein, the other shaft 131a can also be rotated at substantially the same speed.

Thereby, when the transfer rollers 131 are rotated, the check P can be transferred in the direction in which the transfer rollers 131 rotate, in other words, in the direction of the transfer path 105.

The alignment roller 135 is installed between the two shafts 131a each to which the two transfer rollers 131 are installed. The alignment roller 135 is rotated in a direction perpendicular to the direction in which the transfer rollers 131 rotate. Thereby, the check P that is transferred by the transfer rollers 131 can be pushed toward the reference alignment surface 130S.

Referring to FIGS. 2 and 3, either shaft 131a on which the transfer rollers 131 are installed is connected, by the bevel gear unit 132, to the shaft 135a on which the alignment roller 135 is installed, whereby the drive force of the alignment drive motor 137 can be transmitted therebetween.

A first gear 133 of the bevel gear unit 132 is installed on the shaft 131a of the transfer roller 131. A second gear 134 of the bevel gear unit 132 is installed on the shaft 135a of the alignment roller 135. Thus, when the shaft 131a of the transfer roller 131 is rotated by the drive force generated from the alignment drive motor 137, the shaft 135a on which the alignment roller 135 is installed can be rotated by the rotation of the second gear 134 that engages with the first gear 133.

A gear ratio between the first gear 133 and the second gear 134 is 1:1 such that when the transfer roller 131 makes a turn, the alignment roller 135 also makes a turn. However, the gear ratio between the first and second gears 133 and 134 is not limited to this.

Meanwhile, as described above, the operation of transferring the check P using the transfer roller 131 in the direction A of the transfer path 105 and the operation of transferring the check P using the alignment roller 135 toward the reference alignment surface 130S may be alternately conducted rather than being conducted simultaneously.

Here, if the distance that the check P is transferred by the alignment roller 135 is longer than the distance that the check P is transferred by the transfer roller 131, the length of the transfer path 105 required for alignment of the check P can be reduced. Thereby, the entire size of the check recognition apparatus 100 can be reduced.

Figure 4A:
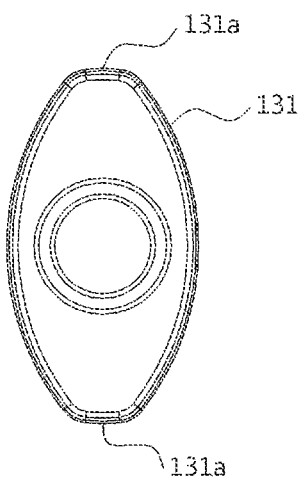
FIG. 4A is a view showing the shape of a transfer roller of FIG. 2.
Figure 4B:
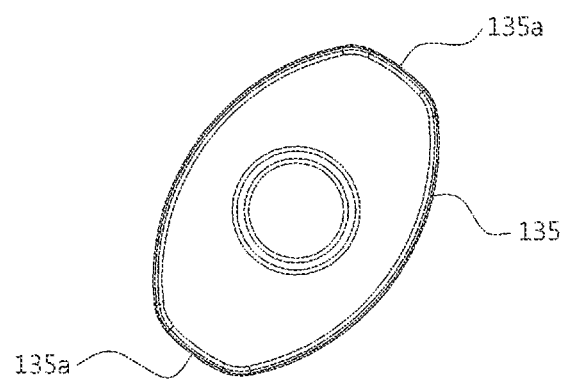
FIG. 4B is a view showing the shape of an alignment roller of FIG. 2.

FIG. 4A is a view showing the shape of a transfer roller of FIG. 2. FIG. 4B is a view showing the shape of an alignment roller of FIG. 2.

Referring to FIGS. 4A and 4B, the transfer roller 131 and the alignment roller 135 are non-circular such that only opposite ends 131a and 135a can come into contact with the check P. Here, the transfer roller 131 and the alignment roller 135 have different non-circular shapes such that paper-medium-holding sections thereof differ from each other. In detail, the alignment roller 135 has a larger non-circular shape than that of the transfer roller 131 so that the paper-medium-holding section of the alignment roller 135 for the check P is greater than that of the transfer roller 131. Thereby, the distance that the check P is transferred by the alignment roller 135 is longer than the distance that the check P is transferred by the transfer roller 131, whereby time required for the alignment of the check P can be reduced.

In this embodiment, the transfer roller 131 and the alignment roller 135 have a phase difference when in an initial position. The term "initial position" refers to the position (rotated state) of the transfer roller 131 and the position (rotated state) of the alignment roller 135 when the check P is held by the transfer roller 131.

Figure 5:
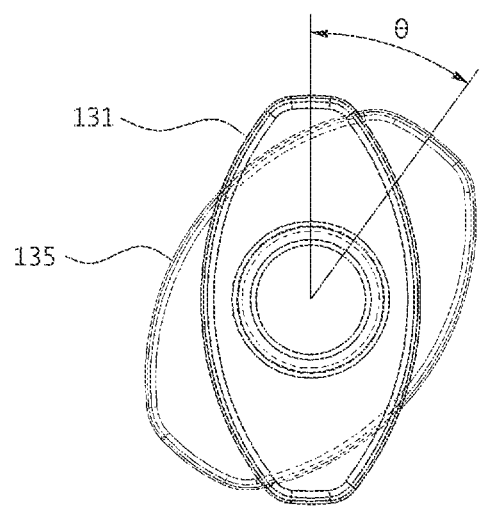
FIG. 5 is a view overlapping initial positions of the transfer roller and the alignment roller when paper media are aligned by the alignment unit of FIG. 2.

FIG. 5 is a view overlapping initial positions of the transfer roller and the alignment roller when paper media are aligned by the alignment unit of FIG. 2.

Referring to FIG. 5 (FIG. 5 is a view overlapping the alignment roller 135 and the transfer roller 131 that are disposed perpendicular to each other on the transfer path 105 and thus comparing the initial positions thereof), when the transfer roller 131 is oriented in the height-wise direction at the initial position, the alignment roller 135 is inclined such that there is a phase difference θ between the alignment roller 135 and the transfer roller 131.

Here, in the initial position, the phase difference θ between the alignment roller 135 and the transfer roller 131 may be an acute angle. In more detail, the phase difference θ may range from 30° to 60°, for example 36°.

As such, the alignment roller 135 and the transfer roller 131 have a phase difference θ in the initial position. Therefore, when the transfer roller 131 is rotated by the phase difference θ while the check P is transferred by the transfer roller 131, transfer (for alignment) of the check P can be conducted by the alignment roller 135.

Figure 6:
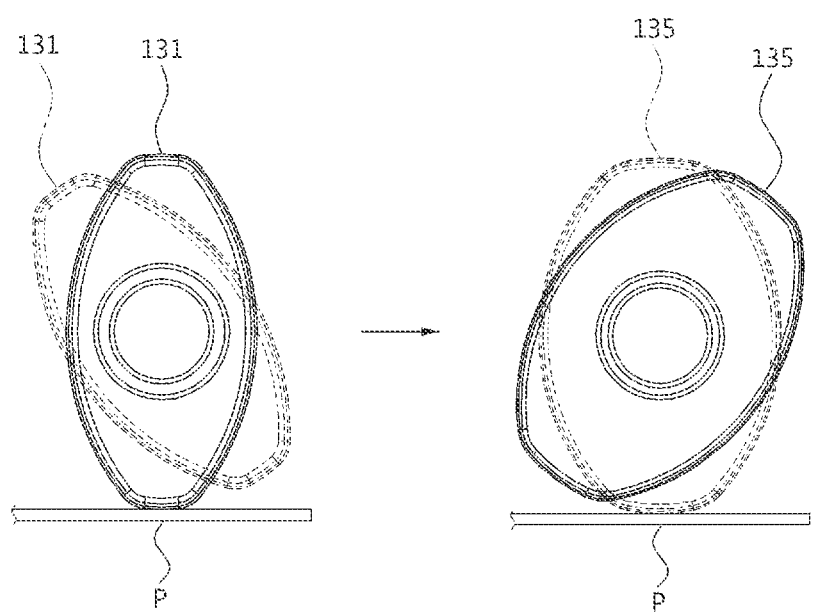
FIG. 6 is a view schematically showing a process of aligning paper media depending on a difference in phase between the transfer roller and the alignment roller of FIG. 2.

FIG. 6 is a view schematically showing a process of aligning paper media depending on a difference in phase between the transfer roller and the alignment roller of FIG. 2.

Referring to FIG. 6, when the transfer roller 131 rotates by a phase difference from the solid line to the dotted line, the alignment roller 135 simultaneously rotates from the solid line to the dotted line and thus can immediately hold the check P transferred from the transfer roller 131.

Between the time for which the check P is transferred by the transfer roller 131 and the time for which the check P is transferred by the alignment roller 135, there is time for which neither the transfer roller 131 nor the alignment roller 135 holds the check P so that the check P can be prevented from being simultaneously held and transferred by the transfer roller 131 and the alignment roller 135. In other words, after a predetermined time has passed after the check P is transferred by the transfer roller 131, the alignment roller 135 transfers the check P.

As stated above, if the phase difference θ between the transfer roller 131 and the alignment roller 135 is 36° in the initial position, the check P is transferred by the transfer roller 131 by 36° based on 180° and transferred by the alignment roller 135 by residual 144°. In a percentage, when the check P is moved by the transfer roller 131 by 1 in the direction of the arrow A, the check P can be moved by the alignment roller 135 by 4 in the direction of the arrow B toward the reference alignment surface 130S.

Therefore, the alignment of the check P can be conducted on the comparatively short transfer path 105, whereby the entire size of the apparatus can be reduced.

Figure 7:
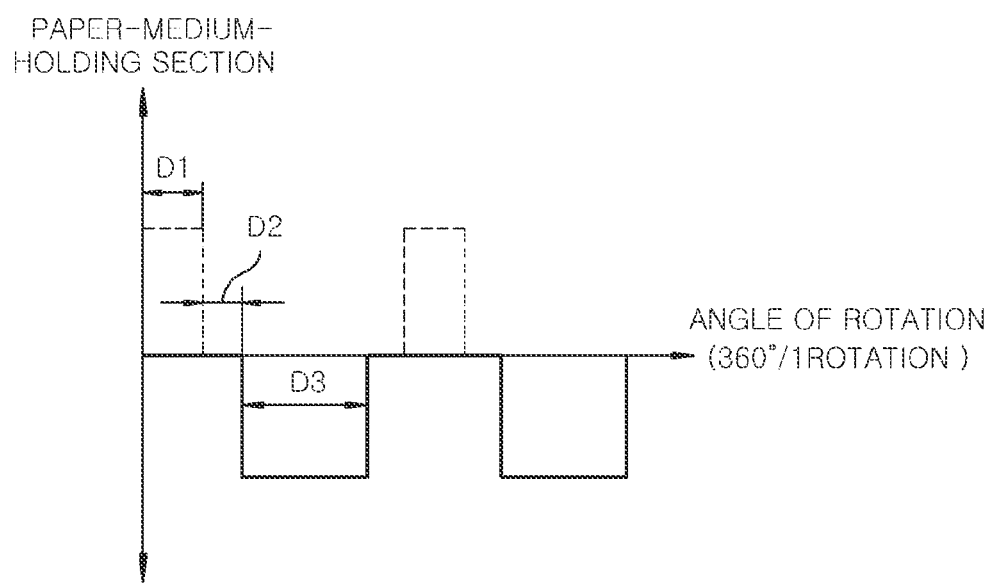
FIG. 7 is a graph showing paper-medium-holding sections as a function of an angle of rotation of the transfer roller and the alignment roller of FIG. 2.

FIG. 7 is a graph showing paper-medium-holding sections as a function of an angle of rotation of the transfer roller and the alignment roller of FIG. 2.

Meanwhile, referring to FIG. 7, after the check P is held by the transfer roller 131 for a predetermined time, the check P can be held by the alignment roller 135 for a period several times longer than the above-mentioned predetermined time.

For example, after the check P is transferred by a first section D1 by the transfer roller 131, the check P can be transferred toward the reference alignment surface 130S by the alignment roller 135 by a section D3 several times longer than the first section D1.

Referring to FIGS. 2 and 3, the alignment unit 130 of this embodiment may further include a plurality of alignment sensors 140 that determines whether the alignment of the check P has been completed while the check P is aligned by the interlocking operation of the transfer roller 131 and the alignment roller 135. In this embodiment, although two alignment sensors 140 will be described as being provided, the present invention is not limited to this.

In this embodiment, the two alignment sensors 140 are arranged along the reference alignment surface 130S. When the check P is sensed by both the two alignment sensors 140, it is determined that the alignment of the check P has been completed. Each alignment sensor 140 may comprise an optical sensor so that whether the alignment of the check P has been completed can be determined by whether transmission and reception of optical signals have been conducted. That is, if optical signal transmission and reception of the two alignment sensors have been completed, it can be determined that the check P has come into contact with the reference alignment surface 130S. If optical signal transmission and reception of either alignment sensor is not completed, it can be determined that the check P is still not aligned with the reference alignment surface 130S.

When completion of the alignment of the check P is sensed by the alignment sensors 140, the control unit 190 interrupts the operation of the alignment unit 130 to allow the check P to be transferred along the transfer path 105.

Hereinafter, a check alignment method of the check recognition apparatus 100 having the above-mentioned construction will be described in detail.

The check alignment method of the check recognition apparatus 100 in accordance with an embodiment of the present invention includes an alignment-unit driving operation, an alignment operation, an alignment sensing operation, and an alignment-unit interruption operation.

In the alignment-unit driving operation of this embodiment, when an approach detection sensor (not shown) senses entrance of the check P on the transfer path 105 disposed in the front of the alignment unit 130, the alignment unit 130 is operated.

In the alignment operation of this embodiment, the transfer roller 131 and the alignment roller 135 of the alignment unit 130 are operated interlocking with each other, whereby the check P can be aligned with the reference alignment surface 130S. The transfer roller 131 and the alignment roller 135 are oriented such that there is a phase difference therebetween in the initial position. Thereby, the distance that the check P is transferred by the alignment roller 135 can be longer than the distance that the check P is transferred by the transfer roller 131. Thus, time required for the alignment operation can be reduced, and the length of the transfer path 105 for alignment can also be reduced.

In the alignment sensing operation of this embodiment, whether the check P is aligned with the reference alignment surface 130S can be sensed by the two alignment sensors 140 that are spaced apart from each other and arranged along the reference alignment surface 130S. Here, only when both the two alignment sensors 140 sense the check P can it be determined that the alignment of the check P has been completed.

In the alignment-unit interruption operation of this embodiment, when the completion of the alignment of the check P is sensed by the alignment sensors 140, the operation of the alignment unit 130 is interrupted to allow check P to be moved in the transfer direction.

As described above, in accordance with the embodiment of the present invention, the transfer and alignment of the check P can be simultaneously conducted by the interlocking operation of the transfer roller 131 and the alignment roller 135 of the alignment unit 130. Therefore, the alignment of the check P can be rapidly conducted. Furthermore, because the transfer roller 131 and the alignment roller 135 are disposed perpendicular to each other, the structure of the apparatus can become compact, thus enhancing efficiency in the use of space in the main body 101.

Moreover, the alignment roller 135 and the transfer roller 131 that are disposed perpendicular to each other are oriented such that there is a phase difference therebetween in the initial position. The distance that the check P is transferred by the alignment roller 135 can be longer than the distance that the check P is transferred by the transfer roller 131. Thereby, time it takes to conduct the alignment operation can be reduced, and the length of the transfer path 105 required for the alignment can be reduced. Furthermore, efficiency in the use of space in the main body 101 can be enhanced, and the size of the apparatus can be reduced.

While the invention has been shown and described with respect to the preferred embodiments, it will be understood by those skilled in the art that various changes and modifications may be made without departing from the spirit and scope of the invention as defined in the following claims.

The invention claimed is:
1. A paper media recognition device, comprising:
a main body; and
an alignment unit in the main body and configured to align a paper medium with a reference alignment surface, the paper medium being transferred along a transfer path in the main body, the alignment unit comprising:
a transfer roller configured to transfer the paper medium along the transfer path; and
an alignment roller configured to transfer the paper medium in a direction traversing the transfer path and toward the reference alignment surface, and wherein the transfer roller and the alignment roller have a phase difference such that a distance that the paper medium is transferred by the alignment roller is longer than a distance that the paper medium is transferred by the transfer roller and wherein the transfer roller has a first non-circular shape having first symmetrical opposite ends to contact the paper medium as the transfer roller is rotated, and the alignment roller has a second non-circular shape having second symmetrical opposite ends to contact the paper medium as the alignment roller is rotated, and wherein a length of the first symmetrical opposite ends along which the transfer roller contacts the paper medium is shorter than a length of the second symmetrical opposite ends along which the alignment roller contacts the paper medium.

2. The device of claim 1, wherein
the alignment roller has a phase difference of an acute angle range with respect to the transfer roller.

3. The device of claim 2, wherein the phase difference between the transfer roller and the alignment roller ranges from 30° to 60°.

4. The device of claim 1, wherein the alignment roller contacts the paper medium after the transfer roller disengages from the paper medium.

5. The device of claim 1, further comprising a first shaft on which the transfer roller is installed, a second shaft extending parallel to the first shaft, and another transfer roller installed on the second shaft transfer roller,
wherein the alignment roller is installed between the first and second shafts and on a third shaft oriented perpendicular to the first and second shafts.

6. The device of claim 5, further comprising a bevel gear unit connecting the third shaft with the second shaft, and
an alignment drive motor connected to the first axis and the second axis to rotate the first axis and the second axis.

7. The device of claim 6, wherein the bevel gear unit comprises: a first gear provided on either of the first shaft or the second shaft; and a second gear provided on the third shaft,
wherein a ratio between a number of teeth of the first gear and a number of teeth of the second gear is 1:1.

8. A method for aligning a paper medium of paper media recognition device, the device comprising: a main body; and an alignment unit in the main body and configured to align the paper medium with a reference alignment surface, the paper medium being transferred along a transfer path in the main body, the alignment unit configured to transfer the paper medium in a direction traversing the transfer path and toward the reference alignment surface, wherein the alignment roller has a phase difference with respect to the transfer roller such that a distance that the paper medium is transferred by the alignment roller is longer than a distance that the paper medium is transferred by the transfer roller,
the paper medium alignment method comprising:
driving the alignment unit when an approach detecting sensor provided in a front end of the alignment unit and disposed on the transfer path senses approach of the paper medium;
aligning the paper medium with the reference alignment surface by means of interlocking the transfer roller and the alignment roller with each other;
sensing whether the paper medium is aligned with the reference alignment surface using a plurality of alignment sensors; and
interrupting the operation of the alignment unit when completion of the alignment of the paper medium is sensed,
wherein in the alignment operation, after the transfer roller is rotated by the phase difference while the paper medium is in contact with the transfer roller, the alignment roller holds the paper medium, and
wherein the transfer roller has a first non-circular shape having first symmetrical opposite ends to contact the paper medium as the transfer roller is rotated, and the alignment roller has a second non-circular shape having second symmetrical opposite ends to contact the paper medium as the alignment roller is rotated, and wherein a length of the first symmetrical opposite ends along which the transfer roller contacts the paper medium is shorter than a length of the second symmetrical opposite ends along which the alignment roller contacts the paper medium.

9. The method for aligning paper medium of claim 8, wherein
the alignment roller is oriented such that the alignment roller has a phase difference of an acute angle range with respect to the transfer roller.

* * * * *